(12) United States Patent
Kadiwala et al.

(10) Patent No.: US 11,704,653 B2
(45) Date of Patent: Jul. 18, 2023

(54) METHODS AND SYSTEMS FOR ENHANCING ONLINE PAYMENT TRANSACTION EXPERIENCE

(71) Applicant: MASTERCARD INTERNATIONAL INCORPORATED, Purchase, NY (US)

(72) Inventors: Asif Kadiwala, Vadodara (IN); Harsh Tak, Sheoganj (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 76 days.

(21) Appl. No.: 16/984,915

(22) Filed: Aug. 4, 2020

(65) Prior Publication Data
US 2021/0065156 A1    Mar. 4, 2021

(30) Foreign Application Priority Data

Aug. 30, 2019 (SG) ............ 10201908025R

(51) Int. Cl.
*G06Q 20/32* (2012.01)
*G06Q 20/34* (2012.01)
(Continued)

(52) U.S. Cl.
CPC ......... *G06Q 20/322* (2013.01); *G06Q 20/341* (2013.01); *G06Q 20/363* (2013.01); *G06Q 20/401* (2013.01)

(58) Field of Classification Search
CPC .. G06Q 20/322; G06Q 20/341; G06Q 20/363; G06Q 20/401
See application file for complete search history.

(56) References Cited

U.S. PATENT DOCUMENTS

2014/0108247 A1* 4/2014 Artman ................. G06Q 20/36
705/44
2017/0068952 A1* 3/2017 Brockmann ....... G06Q 20/4014
(Continued)

OTHER PUBLICATIONS

System and method about widget dynamically relocation, https://ip.com/IPCOM/000227442 (Year: 2013).*

*Primary Examiner* — Jessica Lemieux
*Assistant Examiner* — Merritt J Hasbrouck
(74) *Attorney, Agent, or Firm* — Jordan IP Law, LLC

(57) ABSTRACT

Embodiments provide methods, and server systems for enhancing online payment transaction experience. A method includes receiving, by a server system associated with a payment network, a tokenization request based on selecting a payment card of a plurality of payment cards of a user from a payment application running on a user device for processing an online payment transaction using the selected payment card at a merchant payment interface on the user device. The tokenization request includes a card information of the selected payment card. The method includes facilitating generation of a digital token. The digital token includes a tokenized card information of the selected payment card. The method includes provisioning the digital token in a floating widget at the merchant payment interface on the user device. The floating widget enables the user to enter the digital token at the merchant payment interface for processing the online payment transaction.

20 Claims, 13 Drawing Sheets

(51) Int. Cl.
*G06Q 20/36* (2012.01)
*G06Q 20/40* (2012.01)

(56) References Cited

U.S. PATENT DOCUMENTS

2017/0161701 A1* 6/2017 Amancherla ........ G06Q 20/322
2018/0082297 A1* 3/2018 Bacastow .......... G06Q 20/4012
2018/0349895 A1* 12/2018 Ericson .............. G06Q 20/3829

* cited by examiner

METHODS AND SYSTEMS FOR ENHANCING ONLINE PAYMENT TRANSACTION EXPERIENCE

CROSS-REFERENCE TO RELATED APPLICATIONS

The present application claims priority to Singapore Patent Application No. 10201908025R (filed on Aug. 30, 2019), which is hereby incorporated by reference in its entirety.

TECHNICAL FIELD

The present disclosure relates to electronic payment transactions and, more particularly to, methods and systems for creating a floating payment card view for entering payment card information on a merchant interface and thereby enhancing user experience of online payment transaction.

BACKGROUND

Nowadays, most users use several banking cards, such as credit cards, debit cards, prepaid cards, etc., for performing financial transactions (e.g., payment transaction). The various banking cards are herein referred to as payment cards. The payment cards are increasingly used for making payments through various channels, such as physical card swipe at point-of-sale (POS) terminals, digital payments, contactless payments, etc. Digital payment industry is moving towards providing better user experience for both consumers and merchants. Consumers digitize the payment cards into the mobile phones, wearable devices etc., using technologies, such as tokenization, Card-on-File (COF) transactions, digital wallets and the like. Tokenization allows consumer to digitize his/her existing payment cards into a mobile phone or other devices using a token and use the token at various merchant terminals. The token may contain a 16-digit number, an expiry date and a Card Verification Value (CVV) which resemble the actual payment card information. Transactions performed using tokens are more secure as the actual card information is protected against theft and misuse.

In a scenario, when a user wants to purchase a product from a merchant application running on his smartphone, the user may select a payment card based payment method at the checkout page of the application. Next, the user is asked to fill in the payment card information using a card information format that includes various information fields and form fields. Examples include a card number, a name of the user, an expiry date, a CVV, etc. The user needs to enter the information using the token i.e., a digitized payment card for a secure payment transaction. Generally, copying of the token from the wallet application and pasting the same on the merchant application is disabled in order to provide extra security.

Therefore, in order to fill each field, the user needs to hover between the wallet application which provides the token and the merchant application on which the token needs to be entered, until completed. The user may try to remember a few digits of the token at a time from the wallet application where the token is present and enter them on the checkout page of the merchant application. This may end up in entering wrong digits and eventually repeat the process again. Alternatively, the user has to copy the token information on a piece of paper and go to the merchant application for manually entering the information. This could be very time consuming, tedious, and generally undesirable for the user.

Accordingly, there is a need for techniques that enable the user to enter the tokenized card information on the merchant payment interface seamlessly and process the payment transaction securely.

SUMMARY

Various embodiments of the present disclosure provide systems, methods, electronic devices and computer program products to enhance online payment transaction experience.

In an embodiment, a computer-implemented method is disclosed. The method includes receiving, by a server system associated with a payment network, a tokenization request based on selecting a payment card of a plurality of payment cards of a user from a payment application running on a user device for processing an online payment transaction using the selected payment card at a merchant payment interface on the user device. The tokenization request at least includes a card information of the selected payment card. The method includes facilitating generation of a digital token. The digital token includes a tokenized card information of the selected payment card. The method further includes provisioning the digital token in a floating widget at the merchant payment interface on the user device. The floating widget enables the user to enter the digital token at the merchant payment interface for processing the online payment transaction.

In another embodiment, a server system in a payment network is provided. The server system includes a communication interface configured to receive a tokenization request based on selecting a payment card of a plurality of payment cards of a user from a payment application running on a user device for processing an online payment transaction using the selected payment card at a merchant payment interface on the user device. The tokenization request at least includes a card information of the selected payment card. The server system includes a memory comprising executable instructions and a processor communicably coupled to the communication interface. The processor is configured to execute the instructions to cause the server system to at least facilitate generation of a digital token. The digital token includes a tokenized card information of the selected payment card. The server system is further caused to provision the digital token in a floating widget at the merchant payment interface on the user device. The floating widget enables the user to enter the digital token at the merchant payment interface for processing the online payment transaction.

In yet another embodiment, a computer program product is provided. The computer program product includes at least one non-transitory computer-readable storage medium. The computer-readable storage medium includes a set of instructions. The set of instructions when executed by one or more processors in an electronic device, cause the electronic device to at least receive a tokenization request based on selecting a payment card of a plurality of payment cards of a user for processing an online payment transaction using the selected payment card at a merchant payment interface. The tokenization request at least includes a card information of the selected payment card. The electronic device is further caused to facilitate generation of a digital token. The digital token includes a tokenized card information of the selected payment card. Moreover, the electronic device is caused to provision the digital token in a floating widget at the merchant payment interface. The floating widget enables the user to enter the digital token at the merchant payment interface for processing the online payment transaction.

BRIEF DESCRIPTION OF THE FIGURES

For a more complete understanding of example embodiments of the present technology, reference is now made to the following descriptions taken in connection with the accompanying drawings in which.

Figure 1:
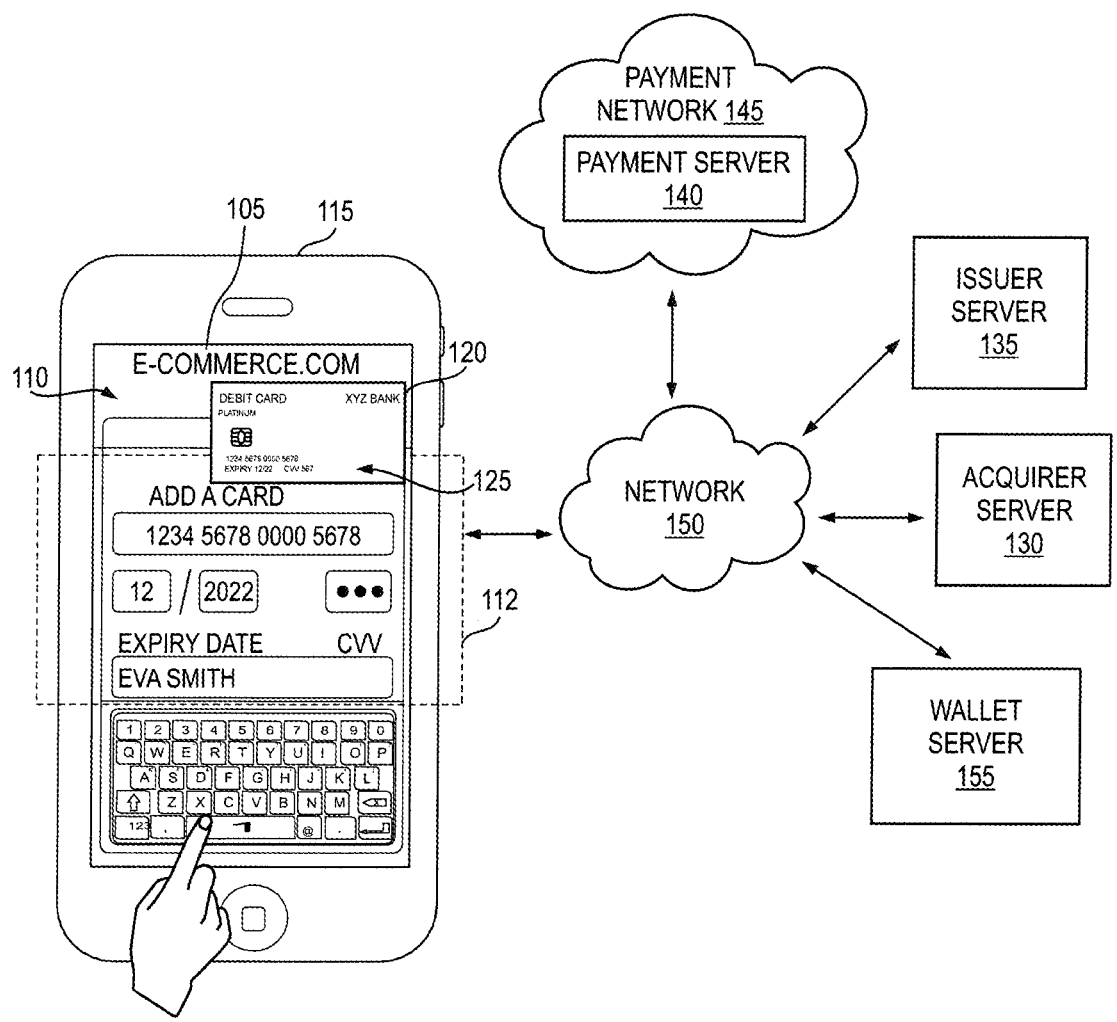
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refer to a financial account that is used to fund the financial transaction (interchangeably referred to as "payment transaction"). Examples of the payment account include, but is not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by PayPal®, and the like.

The term "payment network", used throughout the description, refer to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, prepaid cards, virtual payment numbers, virtual card numbers, forex cards, charge cards and stored-value cards. A payment card may be a physical card that may be presented to the merchant for funding the payment. Alternatively, or additionally, the payment card may be embodied in form of data (e.g., a digital token) stored in a user device, where the data is associated with payment account such that the data can be used to process the financial transaction between the payment account and a merchant's financial account.

Overview

Various example embodiments of the present disclosure provide methods, systems, user devices and computer program products for enhancing online payment transaction experience of a user by enabling usage of a floating payment card in a widget for entering the card details on the merchant payment interface during the payment transaction.

In various example embodiments, the present disclosure provides a server system configured to receive a tokenization request generated from a user device, such as a mobile phone of a user to tokenize a payment card linked with the user. The tokenization request is generated using a payment application accessible on the user device as facilitated by a wallet server (an example of the server system). The user may be required to authenticate himself, for example, by providing a biometric information on a UI of the payment application prior to initiating the tokenization request. Examples of the wallet server include mobile banking applications, bank wallet applications, third-party wallet applications, payment gateways or any other Internet of Things (IoT) payment devices. The tokenization request includes a card information of the payment card of the user. The tokenization request may also include additional information such as, but not limited to, a mobile number of the user, a payment application identifier, a primary account number of the user, a transaction limit and the like.

In one embodiment, the wallet server facilitates generation of a digital token upon receiving the tokenization request. The wallet server sends the tokenization request to an interchange server (i.e. a payment server, an example of the server system). The payment server sends the tokenization request to an issuer server (an example of the server system) for authorization. The issuer server is configured to validate the card information. The issuer server notifies the payment server about successful validation of the tokenization request. Thereafter, the payment server generates a digital token for the payment card. The digital token includes safe and secure tokenized card information of the payment card. In a non-limiting example, the payment server may replace the payment card's primary account number (e.g., the 16-digit number present on the physical payment card) with a unique alternate card number that is called a token/digital token.

In one embodiment, the digital token is sent to the user device via the payment application facilitated by the wallet server as received from the payment server. The user is enabled to use the digital token for various merchant payment interface such as, but not limited to, mobile point-of-sale transactions, in-app purchases, online purchases, contactless tap and pay transactions, and the like. For example, the digital token can be entered at a checkout page (an example of the merchant payment interface) of a merchant e-commerce website using the user device. In order to enable the user to effortlessly enter the digital token on the checkout page, the payment application is configured to provision a floating widget that includes the digital token as an image on the display screen of the user device where the merchant website is open. The size of the floating widget is minimal enough to show the details correctly. Further, the floating widget can be moved to any corner of the display screen of the user device for entering the tokenized card information.

Furthermore, the server system is configured to facilitate display of a pre-defined list of merchants for user selection on a User Interface (UI) of the payment application. The user is given option to select one or more merchants or merchants' applications installed on the user device from the pre-defined list of the merchants to authorize the generation of the floating widget (that would include the token) for the selected merchants. Therefore, the payment application provisions a respective digital token in a corresponding floating widget only for each of the one or more merchants selected by the user. This feature provides added security.

In one embodiment, as the payment application already has a list of selected merchants, when the user is at a checkout page/the merchant payment interface of an authorized merchant's application, the user selects an option for 'pay using a token' on the check-out page. The selection of paying using token option triggers tokenization of the payment card. The merchant application communicates with the payment application to request tokenization of the payment card. Without the need of the user to visit the payment application to provide the tokenization command, the tokenized card information is displayed in a floating widget by the payment application on the check-out page of the merchant's application.

The merchant payment interface sends the digital token to an acquirer server (an example of the server system) associated with an acquirer bank of the merchant after receiving the digital token as entered by the user from the floating widget. The acquirer server sends the digital token to the payment server for validation. The payment server validates the digital token and retrieves the underlying card information of the tokenized payment card for sending to the issuer server for authorization. The payment server may also send the transaction amount to the issuer server to verify sufficient funds present in an issuer account of the first user. Once, the payment server receives confirmation of authorization of the card information from the issuer server, the payment server facilitates the payment transaction from the issuer account of the user to the merchant account.

Various example embodiments of present disclosure are described hereinafter with reference to FIGS. 1 to 11.

FIG. 1 illustrates an example representation of an environment 100, in which at least some example embodiments of the present disclosure can be implemented. A merchant application 105 (exemplarily represented as 'e-commerce.com') is shown running on a user device 115 (i.e., a mobile phone) of a user (not shown). Examples of the user device 115 include, but are not limited to, a personal computer (PC), a mobile phone, a tablet device, a Personal Digital Assistant (PDA), a voice activated assistant, a Virtual Reality (VR) device, a smartphone and a laptop. A checkout page 110 (an example of the merchant payment interface for online payment transactions) of the merchant application 105 is shown seeking payment card information of a payment card (not shown) of the user to process a payment transaction as initiated by the user using the user device 115.

The merchant application 105 is shown to display various form fields 112 to be filled by the user such as a payment card number (e.g., xxxx xxxx xxxx xxxx where 'x' is an integral number) of the payment card, expiry date (e.g., MM/YYYY, month and year of expiry), Card Verification Value (CVV) number (e.g., *** where * is an integral number) and the like. The payment card is exemplarily represented as '1234 5678 0000 5678'. The expiry date is exemplarily represented as '12/2022'. The name of the user is exemplarily represented as 'Eva Smith'. The form fields 112 may collectively be referred to hereinafter as a card information 112 of the payment card. Alternatively, the card information 112 may include information such as cardholder's payment account number, or any identification number associated with the payment card.

Various embodiments of the present disclosure provide mechanisms such that the user is enabled to enter the card information 112 from a floating widget 120 that includes a tokenized card information of the payment card in the form of a digital token 125 to be entered on the merchant application 105 in order to process the payment transaction. In a non-limiting example, the token 125 is a numeric code of variable length (13 to 19 digits). As shown, the user has entered the card information 112 as visible from the token 125 on the floating widget 120. To have the token 125 in the floating widget 120, the user needs to initiate a tokenization request from a payment application (not shown) where the payment card is linked by switching from the merchant application 105. For instance, the user needs to select a preferred payment card. The underlying card information is used by the payment application to generate the tokenization request of tokenizing the payment card.

In a non-limiting example, the process of tokenization of the payment card and provisioning of the digital token 125 in the floating widget 120 for completion of the payment transaction is facilitated by a combination of a wallet server 155, a payment server 140, an issuer server 135 and an acquirer server 130. In one embodiment, the tokenization request is sent to the payment server 140 associated with a payment network 145. The payment network 145 may be used by the payment cards issuing authorities as a payment interchange network. Examples of payment interchange network include, but not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.). Further, Mastercard Digital Enablement Service (MDES) is a service/a tokenization platform facilitated by Mastercard® payment system interchange network that allows issuers, registered users, token requestors and merchants to turn the payment card numbers into digital tokens for secure digital payment transactions.

In one embodiment, the payment application is facilitated by the wallet server 155. The wallet server 155 is associated with a token requestor which needs to register with a token service provider (e.g., the payment server 140/MDES) in order to request generation of the digital tokens. Examples of token requestor include mobile banking applications, bank wallet applications, third-party wallet applications, payment gateways and the like. Digital wallet platforms such as Apple Pay®, Samsung Pay®, Google pay Microsoft Wallet etc., provide mobile and web applications (e.g., the payment application) using which the users can generate the tokenization request of their payment cards as well as use the generated digital tokens (e.g., the digital token 125) for digital payments at the merchant interfaces.

In one example embodiment, the wallet server 155 may store the payment application and provision instances of the application to end-users on their respective user devices for facilitating the token generation and thereby provisioning the digital token in the floating widget for processing various online payment transactions. The end-users may request the wallet server 155 to provision access to the payment application over a network 150. The instances of the application may thereafter be downloaded on the user devices (such as the user device 115) of the respective end-users in response to their request for access to the application. Alternatively, in some embodiments, the application may be factory installed within the user devices associated with the end-users and, as such, the users may not need to explicitly request the application from the wallet server 155.

The issuer server 135 is associated with a financial institution normally called as an "issuer bank" or "issuing bank" or simply "issuer", in which the user may have an account, which issues a payment card, such as a credit card or a debit card. The issuer server 135 also facilitates authorization of the tokenization request received from the user device 115.

To accept payment using the digital token 125 based payment transaction, the merchant (not shown) must normally establish an account with a financial institution that is part of the financial payment system. This financial institution is usually called the "merchant bank" or the "acquiring bank" or "acquirer bank" or simply "acquirer". The acquirer server 130 is associated with the acquirer bank.

Using the payment network 145, the computers of the acquirer/the acquirer server 130 or the merchant processor communicate with the computers of the issuer/the issuer server 135 to determine whether the user's account is in good standing and whether the purchase is covered by the user's available account balance. Based on these determinations, authorization of the payment transaction is declined or accepted. When the authorization is accepted, the available balance of the user's account is decreased. Normally, a charge is not posted immediately to a user's account because bankcard associations, such as Mastercard International Incorporated®, have promulgated rules that do not allow a merchant to charge, or "capture," a transaction until goods are shipped or services are delivered. When the merchant ships or delivers the goods or services, the merchant captures the transaction by, for example, appropriate data entry procedures on the point-of-sale (POS) terminal. If a user cancels a transaction before it is captured, a "void" is generated. If the user returns goods after the transaction has been captured, a "credit" is generated.

After a transaction is captured, the transaction is settled between the merchant, the acquirer and the issuer. Settlement refers to the transfer of financial data or funds between the merchant's account, the acquirer, and the issuer, related to the transaction. Usually, transactions are captured and accumulated into a "batch", which is settled as a group.

The user device 115, a merchant device (not shown) associated with the merchant interface (e.g., the merchant application 105), the issuer server 135, the acquirer server 130, the wallet server 155 and the payment server 140 communicate with one another using the network 150. Examples of the network 150 may include any type of wired network, wireless network, or a combination of wired and wireless networks. A wireless network may be a wireless local area network ("WLAN"), a wireless wide area network ("WWAN"), or any other type of wireless network now known or later developed. Additionally, the network 150 may be or include the Internet, intranets, extranets, microwave networks, satellite communications, cellular systems, personal communication services ("PCS"), infrared communications, global area networks, or other suitable networks, etc., or any combination of two or more such networks.

Since the user already has a ready reference in the form of a floating, resizable, non-copiable, secure widget that includes the digital token to be entered on the merchant application 105, the overall transaction flow is effortless for completing the payment transaction for the user. In existing (conventional) payment transaction methods (i.e., not in accordance with the present disclosure), the user is either required to hover between the merchant application 105 and the payment application on the user device 115 continuously until the card details 112 are completely entered or copy the digital token 125 (hereinafter alternatively referred to as the token 125) manually on a piece of paper and later enter it again on the merchant application 105. In contrast to existing payment transaction methods, by using the embodiments of the present disclosure, the user is only required to tokenize his choice of the payment card and a floating widget with a secure digital token of the same card is shown for the user to enter the details from. Hence, the user does not need to worry about remembering the token digits if he has opted to hover between the merchant application 105 and the payment application which further increases the risk of errors and thereby repeating the whole process again. Some non-exhaustive example embodiments of completing online payment transactions using digital tokens in floating widgets are described with reference to the following description, particularly with reference to FIG. 2 to FIGS. 4A to 4G.

Figure 2:
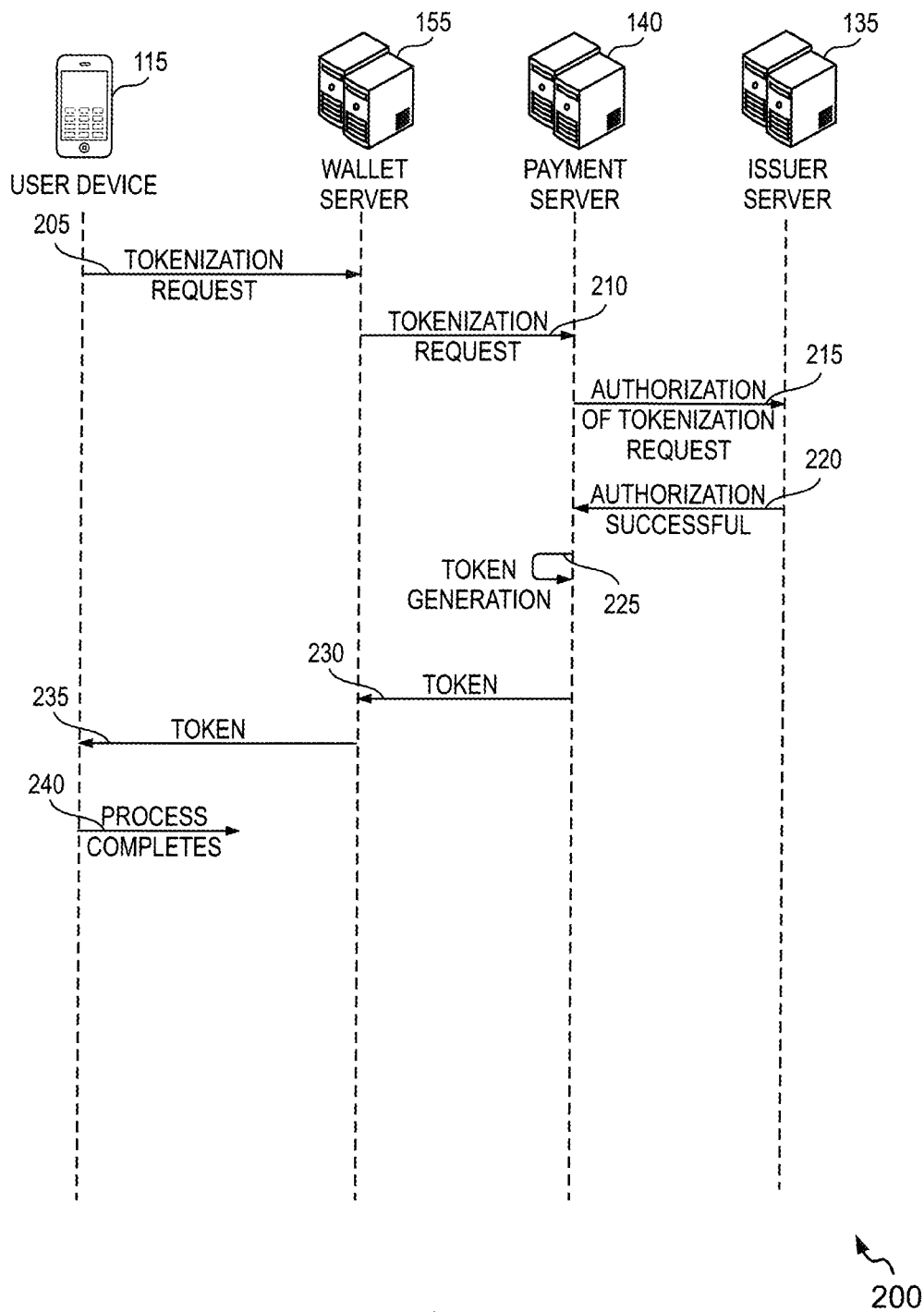
FIG. 2 represents a sequence flow diagram representing a generation of a digital token, in accordance with an example embodiment.

FIG. 2 represents a sequence flow diagram 200 representing the generation of the token 125, in accordance with an example embodiment of the present disclosure. In at least one embodiment, and as explained with reference to FIG. 1, when a user wants to purchase a product or a service from a merchant interface, such as a merchant mobile application or a merchant website, the user is asked to enter payment card details at the checkout page upon selection of the cards as a preferred payment method for processing the payment transaction. Therefore, the user needs to move out of the merchant application for a time being and go to the payment application where one or more of his payment cards are linked in order to get the card details.

At 205, a user upon accessing the website and/or a payment application (as facilitated by the wallet server 155) accessible on his user device (e.g., a user device 115), is presented with one or more UIs displayed (not shown) on a display screen of the user device 115 to send a tokenization request of a payment card (linked to the payment application) to the wallet server 155. As explained with reference to FIG. 1, the tokenization request is generated by the payment application based on receiving a user selection of a preferred payment card from a plurality of payment cards of the user linked to the payment application. Further, the tokenization request includes the underlying card information of the selected payment card to be used for generation of a token. Additionally, the tokenization request may include a merchant name based restriction, a merchant category code based restriction, and the like.

At 210, the wallet server 155 sends the tokenization request to the payment server 140 for tokenization of the payment card. At 215, the payment server 140 sends the tokenization request to the issuer server 135 for authorization. Authorization of the card information of the payment card is performed by the issuer server 135. The authorization process includes validating the card information of the payment card. Further, verification of the cardholder identification is performed by the issuer server 135. At 220, the issuer server 135 notifies the payment server 140 of the successful authorization of the tokenization request as well as verification of the cardholder.

At 225, the payment server 140 is configured to generate a digital token (e.g., the token 125) that includes a tokenized card information of the payment card. In an example embodiment, the payment server 140 is configured to generate a digital token for any funding source of the user other than the payment card. Token values vary in format and may be cryptographically or non-cryptographically generated. Further, the token format may be a PAN-formatted replacement value based on a designated token Bank Identification Number (BIN) or token card range. For example, the token may contain a replacement value for each of a sixteen-digit number, an expiry date (actually applicable for the validity of the token), a CVV, etc., of a physical payment card of the user so as to use such tokenized card information at various merchant payment interfaces. Further, a single PAN may be mapped to multiple tokens for different scenarios. Also, in place of an account PAN of the user, a 16-digit token may be generated such that the use of a token rather than a PAN minimizes the impact of account data compromise.

If compromised or stolen, tokens reduce the likelihood of subsequent fraud since they have no value outside a specific device, merchant or acceptance channel. Further, the usage of the token can be restricted based on multiple criteria, such as assigning the token to a specific device, channel, merchant or geographic location or a combination of these to restrict the transaction within that domain. The generated tokens and the original PANs they map to are stored securely in a database of the payment server 140 and the mapping is used during the de-tokenization process i.e., during a payment transaction. The payment server 140 is further configured to continually manage the token through suspension, deletions, updates, etc.

At 230, the payment server 140 sends the token to the wallet server 155. At 235, the wallet server 155 further sends the token to the user device 115 via the payment application. The token generation process completes at operation 240.

Figure 3A:
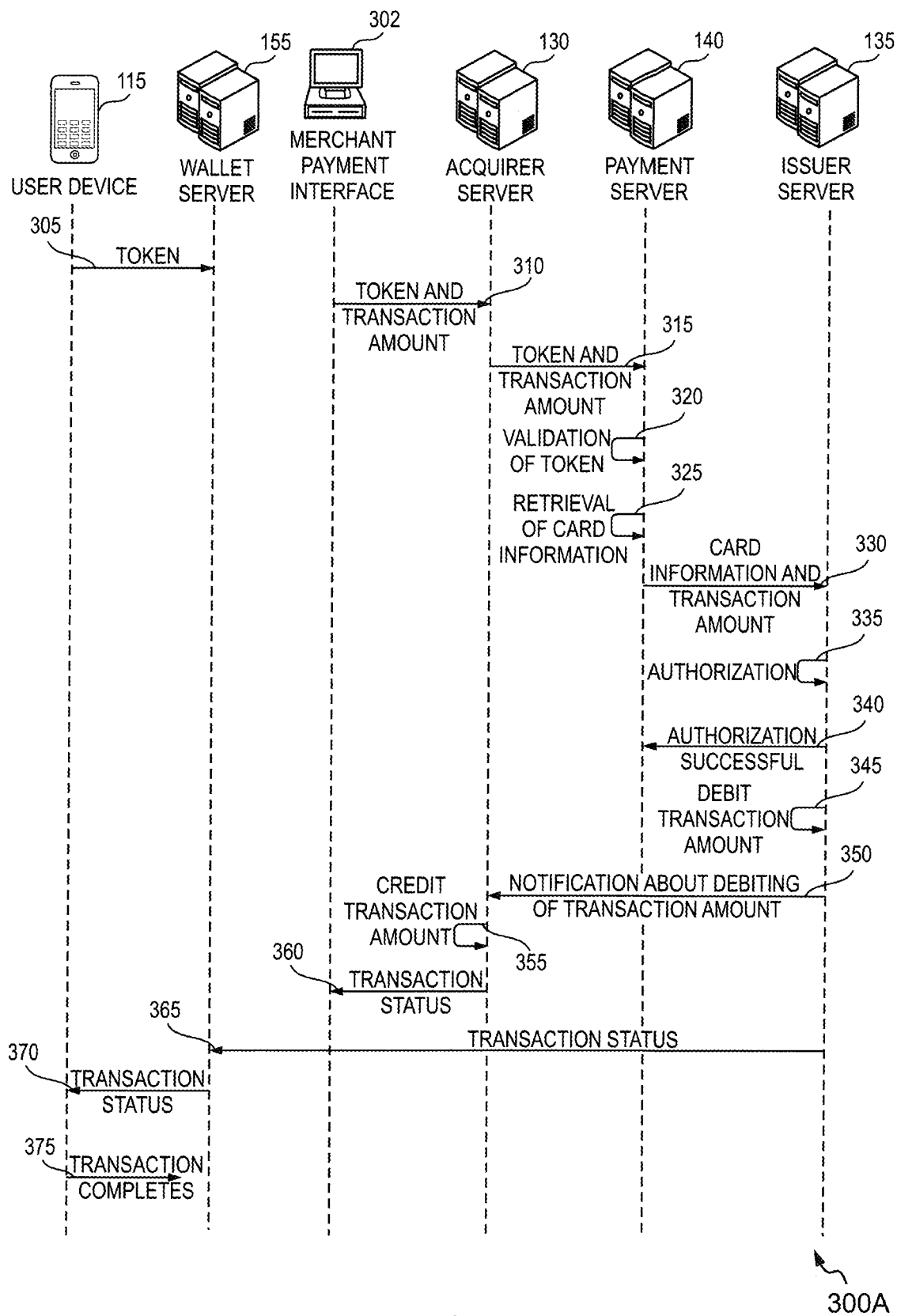
FIG. 3A represents a sequence flow diagram representing a completion of a payment transaction using the digital token in a floating widget, in accordance with an example embodiment.

FIG. 3A represents a sequence flow diagram 300A representing a completion of a payment transaction using a digital token in a floating widget, in accordance with an example embodiment.

As explained with reference to operation 235 of FIG. 2, the payment application displays the token (e.g., the token 125) on the user device 115. In at least one embodiment, upon generation of the token, the payment application is configured to generate a floating widget that includes the token. The floating widget is a control element in a graphical user interface. The floating widget is also referred as a palette window or a utility window or a floating palette that floats on top of all regular windows and offers ready access tools, commands or information for the current/parent application. The floating window is scaled to fit contents, it is movable, and consumes less of a computer's/any user device's commonly landscape oriented screen space. Further, the floating widget is only visible while the parent application has focus.

In at least one embodiment, such floating widget that includes the token is displayed on the merchant payment interface (i.e., the checkout page of the merchant application). Using the token readily available in the floating widget, the user is enabled to enter the tokenized card details on the merchant payment interface very conveniently by switching back to the merchant application. In an example embodiment, the wallet server 155 uses the APIs supported by the respective Operating Systems running on the user device to generate the floating widget and display the token. The payment process flow carried out using the token in the floating widget is explained in detail with corresponding UIs with reference to FIGS. 4A to 4G later.

At 305, a merchant payment interface 302 receives the token as entered by the user from the floating widget present on the merchant application running on the user device 115. The merchant payment interface 302 can be associated with an online merchant interface, such as a merchant website, mobile or desktop applications, or third-party websites or applications using which the consumer/user may purchase goods or service from a remote location. At 310, the merchant payment interface 302 sends the token and a transaction amount to the acquirer server 130 for further processing.

At 315, the acquirer server 130 sends the token and the transaction amount to the payment server 140 for validation. The acquirer server 130 also determines the acquirer account of the merchant and sends the acquirer account details to the payment server 140. At 320, the payment server 140 validates the token by mapping the token to its associated cardholder PAN (i.e., PAN of the user) stored in the database. Further, the payment server 140 identifies the merchant using the acquirer details received from the acquirer server 130 for facilitating completion of the payment transaction.

At 325, the payment server 140 retrieves the card information of the payment card from the token through de-tokenization process. The payment server 140 further validates if the requested payment transaction is in line with any transaction limitations or restrictions for the use of the token as stored in the database of the payment server 140. If any of the validations fails, the payment server 140 rejects the transaction and notifies the acquirer server 130 accordingly. In an embodiment, the payment server 140 is configured to store the token and the associated payment credentials, such as the card information and the like in a cloud storage.

At 330, the retrieved card information and the transaction amount are sent to the issuer server 135 for authorization. At 335, the issuer server 135 performs authorization of the payment card and transaction amount by verifying the card information of the payment card, available balance amount in the cardholder account against the received transaction amount, issuer account information and the like. Some non-exhaustive examples of the issuer account information include Bank Identifier Code (BIC), account number, payment card number and the like.

At 340, the issuer server 135 notifies the payment server 140 of the successful authorization of the payment card, the user and the transaction amount. At 345, the issuer server 135 debits the transaction amount from the user's account. At 350, the issuer server 135 sends a notification of debiting of the transaction amount to the acquirer server 130 via the payment network 145. At 355, the acquirer server 130 credits the transaction amount in the merchant account. At 360, the acquirer server 130 sends the transaction status to the merchant payment interface 302. The transaction status may include successful, failure or pending. At 365, the issuer server 135 sends the transaction status to the wallet server 155. At 370, the wallet server 155 sends the transaction status to user device 115 of the user. Alternatively, the transaction status may be sent by the merchant payment interface 302 to the user device 115. The transaction process completes at operation 375. Once the transaction completes, the floating widget and the corresponding token is automatically closed by the payment application for security purposes. Alternatively, the user is enabled to close the floating widget manually using a close button provided at the top corner of the floating widget window.

Thus, a payment transaction flow using the digital token displayed in the floating widget as explained collectively with reference to FIGS. 2 and 3A provides the end consumers a better user experience as compared to conventional techniques. Since, only the token flows through the various channels, it prevents misuse of the card information. Further, as the user is provided with a facility to effortlessly enter the tokenized card information from the floating widget, he is sparred from remembering the token digits or noting them down manually on other resources for entering on the merchant application.

Figure 3B:
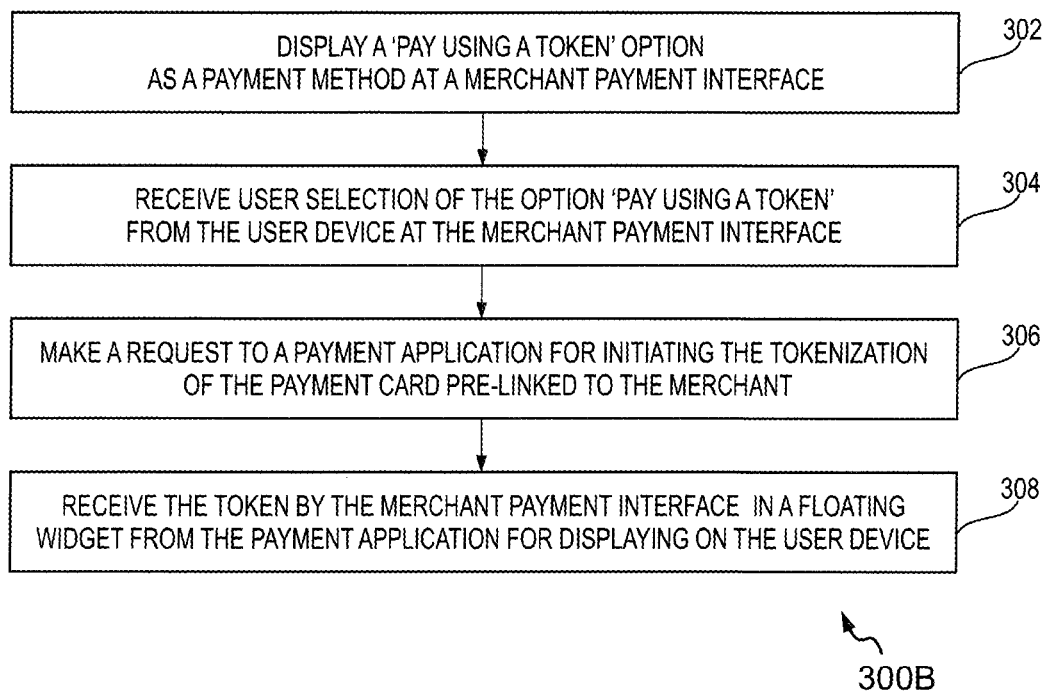
FIG. 3B represents a flow diagram of a method for completing a payment transaction using the digital token in the floating widget, in accordance with another example embodiment.

FIG. 3B represents a flow diagram of a method 300B for completing a payment transaction using a digital token in a floating widget, in accordance with another example embodiment. In one embodiment, the payment application is configured to facilitate display of a pre-defined list of merchants for user selection using a User Interface (UI) on the user device (e.g., a user device 115) at the time of user registration. The user is given option to select one or more merchants on the user device from the pre-defined list of the merchants to authorize the generation of the floating widget (that would include the token) for the selected merchants. The merchant can be selected by providing merchant name, merchant application or merchant domain name.

At 302, a merchant payment interface displays a 'pay using a token' option as a payment method for processing the payment truncation. Therefore, the user is not asked to enter payment card details at the checkout page as he has not selected 'cards' as a preferred payment method for processing the payment transaction. As the merchant is pre-authorized by the user via the payment application, the merchant application is configured to add token based payment method for a quicker user check-out experience.

At 304, the merchant payment interface receives user selection of the option 'pay using a token' from the user device.

At 306, the merchant payment interface communicates with the payment application for initiating the tokenization of the payment card pre-linked to the merchant. Therefore, the user does not need to move out of the merchant application for a time being and go to the payment application where one or more of his payment cards are linked in order to get the card details or to provide the tokenization command of the payment card.

At 308, the merchant payment interface receives the token in a floating widget from the payment application for displaying on the user device. The method ends at step 308. Using the token readily available in the floating widget, the user is enabled to enter the tokenized card details on the merchant payment interface very conveniently without switching between the merchant application and the payment application. In one embodiment, as the merchant application receives the token as entered by the user, the token is sent to the acquirer server 130. The steps 315-375 are processed as explained with reference to FIG. 3A for completing the payment transaction.

FIGS. 4A to 4G represents an example representation of an online payment process flow using a digital token in the floating widget displayed at a merchant payment interface on the user device with corresponding User Interfaces (UIs), in accordance with an example embodiment.

Figure 4A:
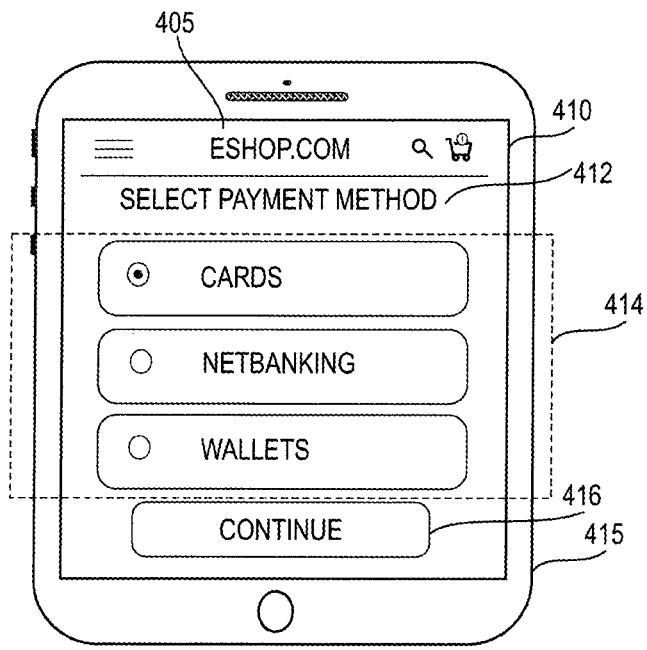
FIGS. 4A to 4G represents an example representation of an online payment process flow using the digital token in the floating widget displayed at a merchant payment interface on the user device with corresponding User Interfaces (UIs), in accordance with an example embodiment.

As shown in FIG. 4A, a merchant application 405 (e.g., eshop.com 405) is configured to display a UI 410 enlisting a number of payment methods for user selection to process a payment transaction on a user device 415 (e.g., a smartphone 415). A header 412 displaying text 'select a payment method' is accompanied by a plurality of payment methods 414 (hereinafter alternatively referred to as payment methods 414) exemplarily displayed as 'cards', 'net banking', and 'wallets'. The UI 410 displays a user selection of the payment method 'cards'. In an alternate embodiment, the user may first select 'wallets' as a preferred payment method and then may be directed to a UI of the wallet application using which the card details may be entered. The user may click a button 416 labeled as 'Continue' to submit the selection of 'cards' as the preferred payment method.

Figure 4B:
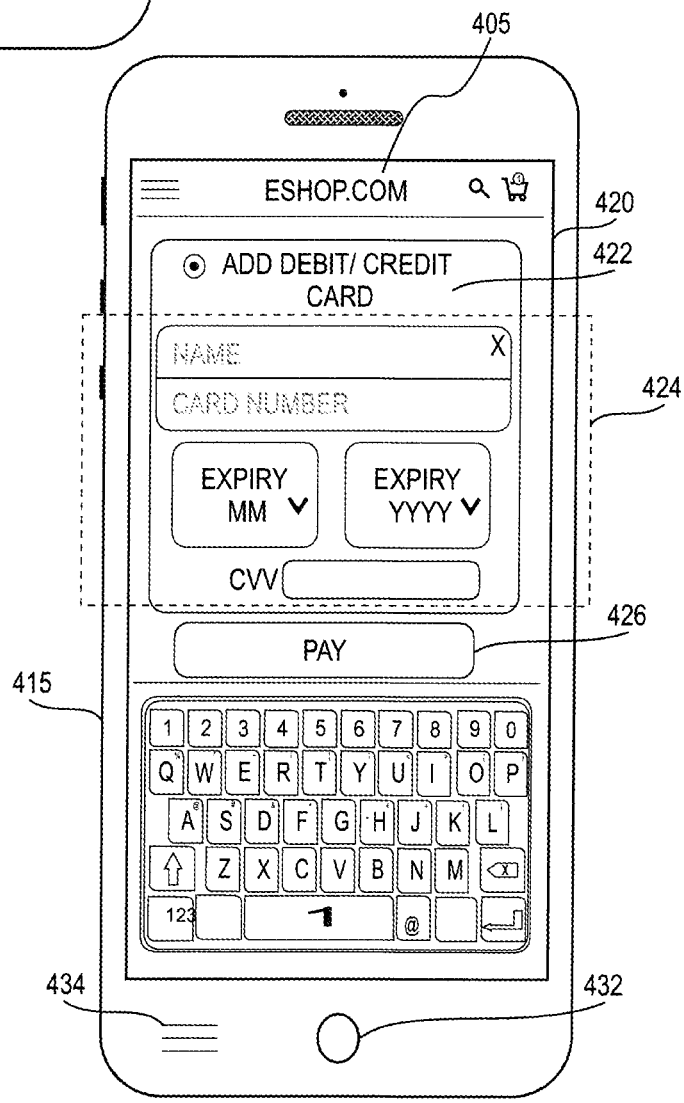
Figure 4C:
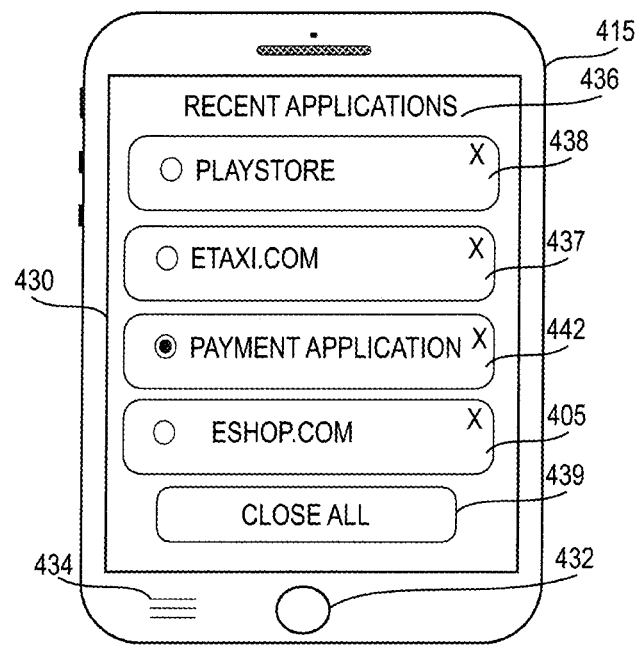

Next, in FIG. 4B, a UI 420 is shown to display a header 422 displaying text 'add debit/credit card'. The header 422 is accompanied by a plurality of form fields and a plurality of selectable icons to be filled/selected by the user. The plurality of form fields and the plurality of selectable icons may collectively be referred to hereinafter as a card information 424 of the payment card. The card information 424 includes a name of the cardholder (an example of the form field), a payment card number of the payment card (an example of the form field), an expiry date (e.g., MM/YYYY, month and year of expiry) (an example of the selectable icon), a CVV number (an example of the form field) and the like. A clickable button 426 labeled as 'pay' is displayed to submit the card information 424 on the merchant application 405.

In order to fill the card information 424, the user needs to have access to the payment card information. Therefore, the user needs to visit the payment application (e.g., a payment application 442 as explained with reference to a UI 440 hereinafter) to which one or more of his payment cards are linked. To achieve this, the user may press and hold a home button 432 or click a recent button 434 placed on the user device 415 to see recently opened applications. Recently opened applications are shown by a UI 430 in FIG. 4C. A header 436 displaying text 'recent applications' is shown accompanied by a plurality of applications exemplarily displayed as eshop.com 405, payment application 442, etaxi.com 437, and play store 438. The payment application 442 is shown to have selected by the user. The UI 430 further includes a button 439 labeled as 'close all', which upon being clicked closes all the recently visited applications. In an example embodiment, instead of visiting recent applications, the user may click the home button 432 on the UI 420 and select the payment application icon displayed on a display screen of the user device 415 for visiting the payment application.

Figure 4D:
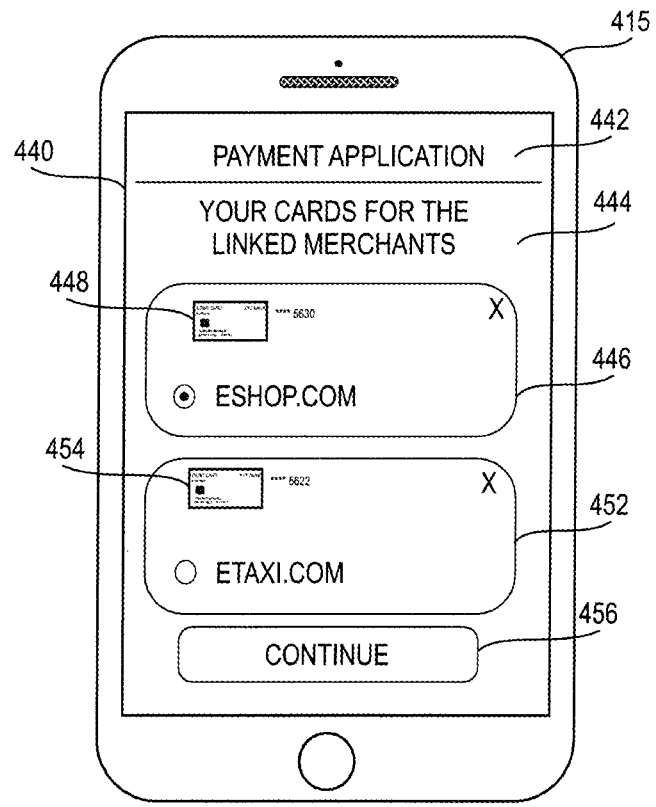
Figure 4E:
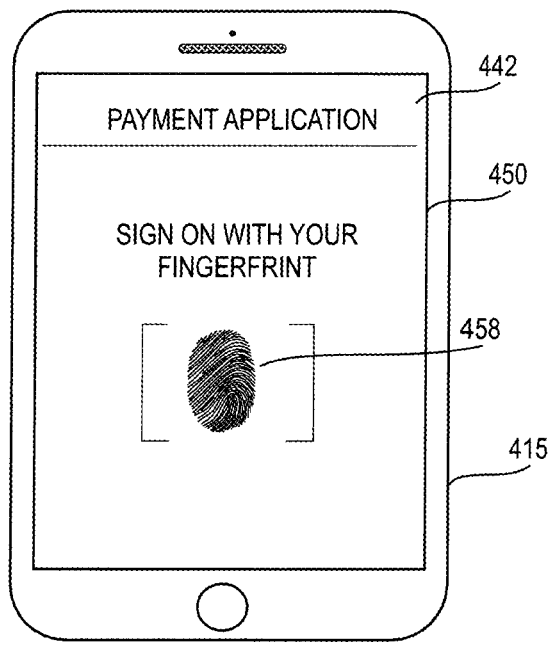
Figure 4F:
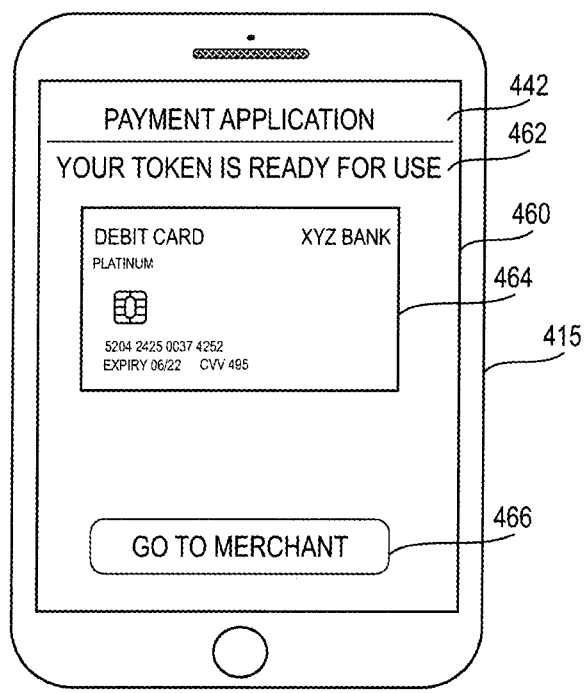
Figure 4G:
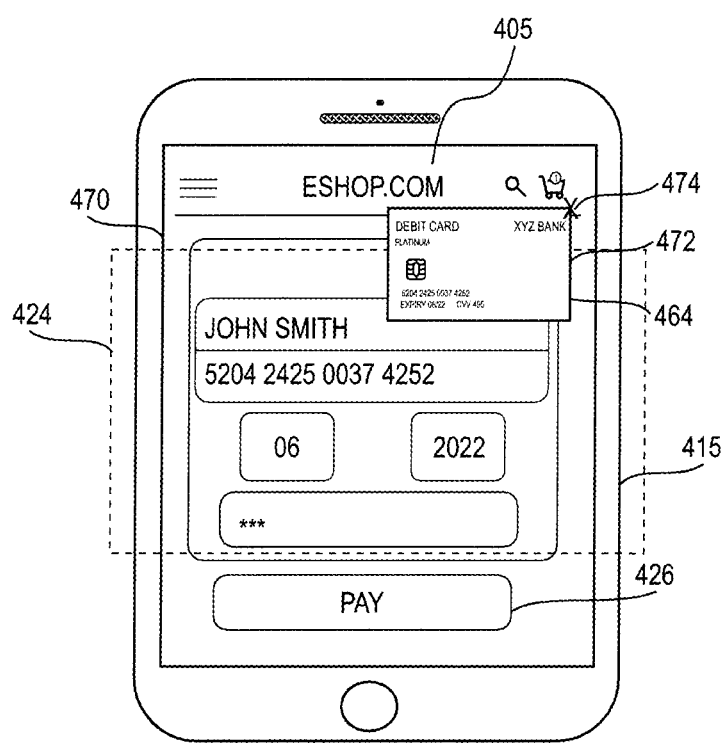

Next, a UI 440 of the payment application 442 is shown in FIG. 4D to display a header 444 displaying text 'your cards for the linked merchants'. Below the header 444, a widget 446 displays eshop.com 405 (i.e., a linked merchant) linked to a payment card 448 (shown as ending with number xxxx xxxx xxxx 5630). Another widget 452 is shown displaying etaxi.com 437 (i.e., another linked merchant) linked to another payment card 454 (shown as ending with number xxxx xxxx xxxx 5622). The user is enabled to select eshop.com 405 linked to the payment card 448 by clicking a button 456 labeled as 'Continue'. Alternatively, the user may only need to select a payment card from a list of one or more payment cards linked to the payment application 442 to initiate the tokenization process of the selected payment card by clicking the button 456. Further, the user is required to authenticate himself by providing a biometric information in order to proceed further. A UI 450 shown in FIG. 4E displays a touch ID exemplarily represented with a biometric icon 458 (e.g., a fingerprint) using which the user can provide input for authentication. Alternatively, the biometric authentication can be performed using face recognition, fingerprint scan, retina scan, iris scan, voice analysis, and the like.

Upon successful authentication, the payment application 442 retrieves the payment card details of the selected payment card 448 and generates a tokenization request for sending to the wallet server 155. As explained with reference to FIG. 2, the wallet server 155 is configured to send the tokenization request to the payment server 140. The payment server 140 generates a digital token having replacement tokenized information of the payment card 448 after receiving successful authorization notification from the issuer server 135 for the tokenization request. The payment server 140 sends the generated token to the wallet server 155. The wallet server 155 displays the generated digital token on a UI via the payment application 442 on the user device 415. Accordingly, in FIG. 4F, a UI 460 is shown to display a header 462 displaying text 'your token is ready for use' accompanied by a token 464. The token 464 displays a tokenized card information of the payment card 448. This is exemplarily displayed as a tokenized card number being 5204 2425 0037 4252, an expiry date being 06/22 for the token 464 and a CVV as 495. The user is required to enter the token 464 on the merchant application 405 to process the payment transaction.

In at least one embodiment, after displaying the token 464 on the UI 460, the payment application 442 is configured to generate a floating widget that includes the token 464 to be displayed on the merchant application 405. A clickable button 466 labeled as 'go to merchant' is displayed, clicking which the user is redirected back to the merchant application 405. Alternatively, the user can directly switch back to the merchant application 405 and still a floating widget that includes the token 464 can be displayed on the merchant application 405. This is further explained by a corresponding UI 470 shown in FIG. 4G.

The UI 470 is same as the UI 420 with an additional floating widget 472 that includes the token 464 as generated by the payment application 442. Using the token 464, the user is enabled to enter the card information 424. For example, a name of the cardholder is displayed as John smith, a payment card number is displayed as a tokenized card number is displayed as 5204 2425 0037 4252, an expiry date is displayed as 06/22 for the token 464 and a CVV is displayed as * (e.g., 495). A clickable button 426 labeled as 'pay' is displayed to submit the card information 424 on the merchant application 405** for processing the payment transaction.

In an example embodiment, the floating widget 472 can be closed by user interactions on the UI 470 such as by swiping down or by clicking a close button 474. The floating widget 472 is automatically closed based on detecting switching of the merchant payment interface (e.g., the UI 470) by an application other than the payment application 442 running on the user device 415. Further, the floating widget 472 is automatically closed based on detecting an inactivity for a predetermined time-period (e.g., 5 minutes) on the merchant payment interface. Screenshot of the floating widget 472 is disabled. Further, the sensitive information is showed as an image so that it cannot be copied. In an example embodiment, the floating widget 472 can be maximized to full screen to see the full details. The widget size is not restricted but it is kept minimal enough to show the details clearly. The floating widget 472 can be moved to any corner of the screen. Further, the secure floating widget 472 can be implemented for any screen using applicable Application Program Interfaces (APIs) supported by various Operating Systems (OSs, e.g., Android or iOS). Moreover, the floating widget 472 can be implemented for various web browsers such as Chrome developed by Google, Safari developed by Apple and the like for facilitating web application based payment transactions The floating widget 472 can be displayed as a horizontal bar with more than one tokens, if the user wishes to use each token for a different merchant application.

As the payment card information 424 is available for the user to enter from the floating widget 472, the time taken to enter the information and the overall time it takes to complete the payment transaction reduces tremendously. Further, as it's a frustration-free checkout, the end-user experience gets enhanced remarkably. Moreover, many times it happens that synchronization between two applications i.e., the merchant application and the payment application get lost during a manual payment card entry at the checkout page of the merchant application. This friction point is also resolved by the features of the present disclosure as the whole need of hovering between the two applications is eliminated completely by the provision of the digital token on the floating widget as a ready reference for the submission.

In an example embodiment, while registering by the user at the payment application 440 by adding one or more payment cards for tokenization and using those tokens for digital transactions using the floating widgets, a UI (not shown) may be displayed by the payment application 442 enlisting a plurality of merchants for user selection. The merchant can be selected by providing one of a merchant name, a merchant application or a merchant domain name. The user may select one or more of the preferred merchants from the list and associate/link one or more of the uploaded payment cards with each selected merchant (e.g., the authorized merchant) for future payment transactions. The payment application 442 is configured to store this information and later when a preferred merchant is selected by the user, a floating widget is generated with the digital token of the linked card for use by the user. This feature provides extra level security by not letting any random website to have the token entered using the floating widget.

In one example embodiment, as the payment application 442 already has a list of selected merchants, when the user is at a checkout page of an authorized merchant's application, the user selects an option for a tokenization of the payment card on the merchant's application. The user may be asked to enter the issuer bank's name after selecting the option for the tokenization of the payment card. This triggers tokenization of the payment card by the payment application 442 and without the need of the user to visit the payment application 442 to provide the tokenization command, the tokenized card information is displayed in a floating widget by the payment application 442 on the check-out page of the merchant's application. In an embodiment, the tokenized card is displayed in the floating widget post authentication of the user.

Although the disclosure is explained with an example of displaying a tokenized payment card information in the floating widget, any sensitive or critical information where user intervention is required to fill or get the information can be shown in the floating widget without deviation from the scope of the invention. For example, once the token is submitted, the user may be directed to a UI (not shown) displayed by a payment getaway (e.g., the payment server 140) to further enter a PIN/a password or a One-time Password (OTP) that is sent by the payment server 140 to the user device 415 for user authentication. For accessing the OTP too, the user needs to switch the applications namely the merchant application and the text message/SMS application on which the OTP is received. In an example embodiment, the network provider APIs can be utilized by the wallet server 155 such that the payment application is able to read the OTP through the SMS and display the same on the payment gateway UI in a floating widget. Therefore, in addition to providing the card information in a floating widget during a payment transaction, an OTP as well may be provided in a corresponding floating widget during the same transaction to assist the user for inputting the respective information.

In one embodiment, the merchant application 405 receives the token 464 as the user clicks the button 426 labeled as 'pay' on the UI 470, the token 464 is sent to the acquirer server 130. The steps 315-375 are processed as explained with reference to FIG. 3A for completing the payment transaction.

Figure 5:
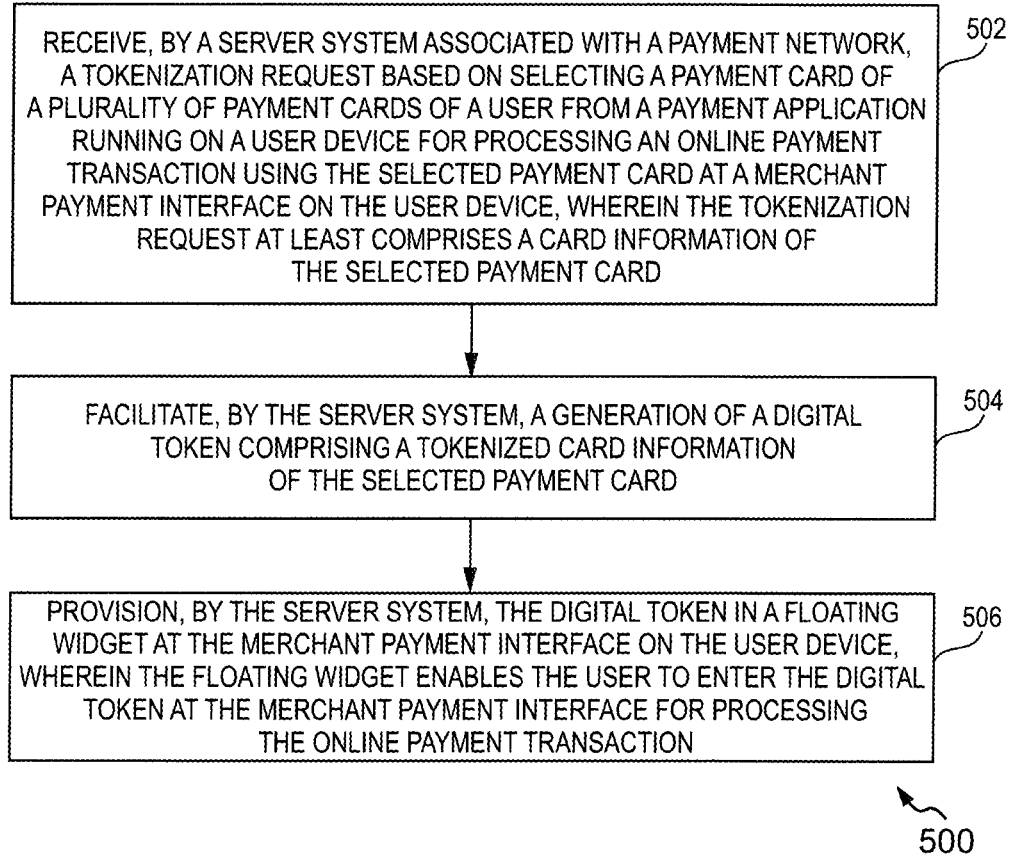
FIG. 5 illustrates a flow diagram of a method for enhancing online payment transaction experience, in accordance with an example embodiment.

FIG. 5 illustrates a flow diagram of a method 500 for enhancing online payment transaction experience, in accordance with an example embodiment. More specifically, the method 500 for enabling usage of a tokenized payment card in a floating widget for use by a user for making a payment transaction at an online payment interface is disclosed. The method 500 depicted in the flow diagram may be executed by, for example, the at least one server system such as the acquirer server 130, the issuer server 135, the wallet server 155 and the payment server 140 explained with reference to FIG. 1. Operations of the flow diagram 500, and combinations of operation in the flow diagram 500, may be implemented by, for example, hardware, firmware, a processor, circuitry and/or a different device associated with the execution of software that includes one or more computer program instructions. The operations of the method 500 are described herein with help of the server systems 130, 135, 155 or 140. It is noted that the operations of the method 500 can be described and/or practiced by using a system other than these server systems. The method 500 starts at operation 502.

At 502, the method 500 includes receiving, by a server system (e.g., the wallet server 155) associated with a payment network, a tokenization request based on selecting a payment card of a plurality of payment cards of a user from a payment application running on a user device for processing an online payment transaction using the selected payment card at a merchant payment interface on the user device. The tokenization request at least includes a card information of the selected payment card. The wallet server 155 may send the tokenization request to the payment server 140 over the payment network 145.

At 504, the method 500 includes, facilitating, by the server system, a generation of a digital token. The digital token includes a tokenized card information of the selected payment card. The payment server 140 may generate the token based on receiving the tokenization request and send the token to the wallet server 155.

At 506, the method 500 includes provisioning, by the server system, the digital token in a floating widget at the merchant payment interface on the user device. The floating widget enables the user to enter the digital token at the merchant payment interface for processing the online payment transaction. The wallet server 155 enables the payment application to generate a floating widget that includes the received token from the payment server 140 to be displayed on the checkout page of the merchant application to facilitate completion of the payment transaction.

Figure 6:
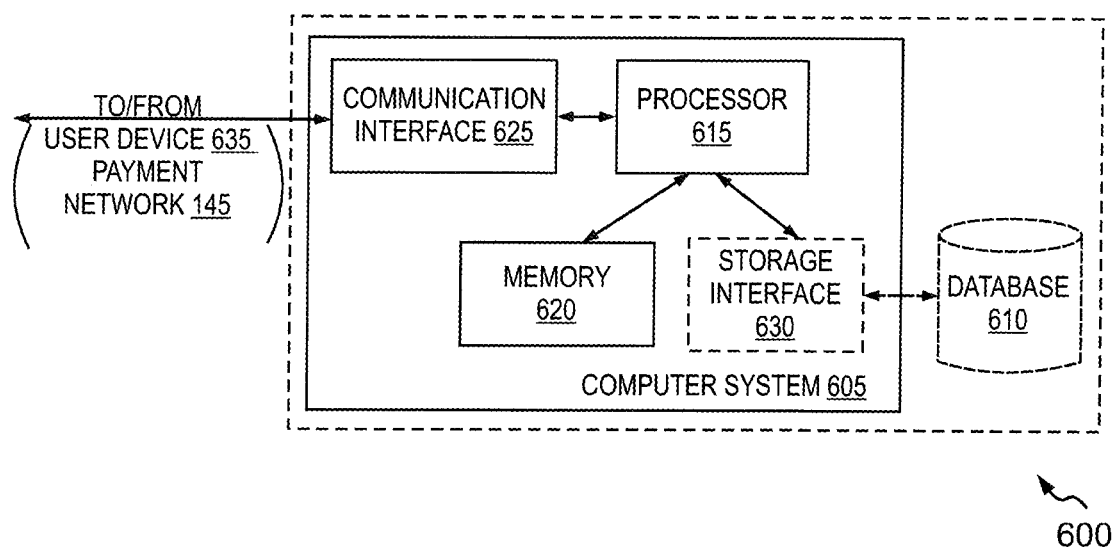
FIG. 6 is a simplified block diagram of a server system, in accordance with one embodiment of the present disclosure.

FIG. 6 is a simplified block diagram of a server system 600, in accordance with one embodiment of the present disclosure. The server system 600 is an example of a server system that is a part of the payment network 145. Examples of the server system 600 includes, but not limited to, the acquirer server 130, the issuer server 135, the wallet server 155 and the payment server 140. The server system 600 includes a computer system 605 and a database 610.

The computer system 605 includes at least one processor 615 for executing instructions. Instructions may be stored in, for example, but not limited to, a memory 620. The processor 615 may include one or more processing units (e.g., in a multi-core configuration).

The processor 615 is operatively coupled to a communication interface 625 such that the computer system 605 is capable of communicating with a remote device such as a user device 635 (e.g., the user device 115) or communicating with any entity within the payment network 145. For example, the communication interface 625 may receive the tokenization request from the user device 635, via the Internet.

The processor 615 may also be operatively coupled to the database 610. The database 610 is any computer-operated hardware suitable for storing and/or retrieving data, such as, but not limited to, transaction data generated as part of sales activities conducted over the bankcard network including data relating to merchants, account holders or customers, and purchases. The database 610 may also store information related to a plurality of user's payment accounts. Each user account data includes at least one of a user name, a user address, an account number, PIN, and other account identifiers. The database 610 may also store device identifiers and the digital tokens. The database 610 may also store a merchant identifier that identifies each merchant registered to use the payment network, and instructions for settling transactions including merchant bank account information (e.g., a plurality of payment accounts related to the merchant interfaces associated with merchants). The database 610 may further include issuer account information. The database 610 may also include a list of merchants as pre-selected by the user only for each of which the digital tokens in the floating widgets are to be generated.

The database 610 may include multiple storage units such as hard disks and/or solid-state disks in a redundant array of inexpensive disks (RAID) configuration. The database 610 may include a storage area network (SAN) and/or a network attached storage (NAS) system. In some embodiments, the database 610 is integrated within the computer system 605. For example, the computer system 605 may include one or more hard disk drives as the database 610. In other embodiments, the database 610 is external to the computer system 605 and may be accessed by the computer system 605 using a storage interface 630. The storage interface 630 is any component capable of providing the processor 615 with access to the database 610. The storage interface 630 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 615 with access to the database 610.

The processor 615 is configured to receive a tokenization request via the communication interface 625. The request is initiated by a user based on selecting a payment card of a plurality of payment cards of a user from a payment application running on a user device. The processor 615 is configured to facilitate generation of a unique digital token based on authorization of the tokenization request received. The authorization of the tokenization request may also be performed by the processor 615 by validating the tokenization request i.e., a card information of the payment card using the associated card information stored in the database 610. The processor 615 is configured to send the digital token to the user device 635 via the communication interface 625. The processor is configured to provision the digital token in a floating widget at a merchant payment interface on the user device 635. The floating widget enables the user to enter the digital token at the merchant payment interface for processing the online payment transaction.

Figure 7:
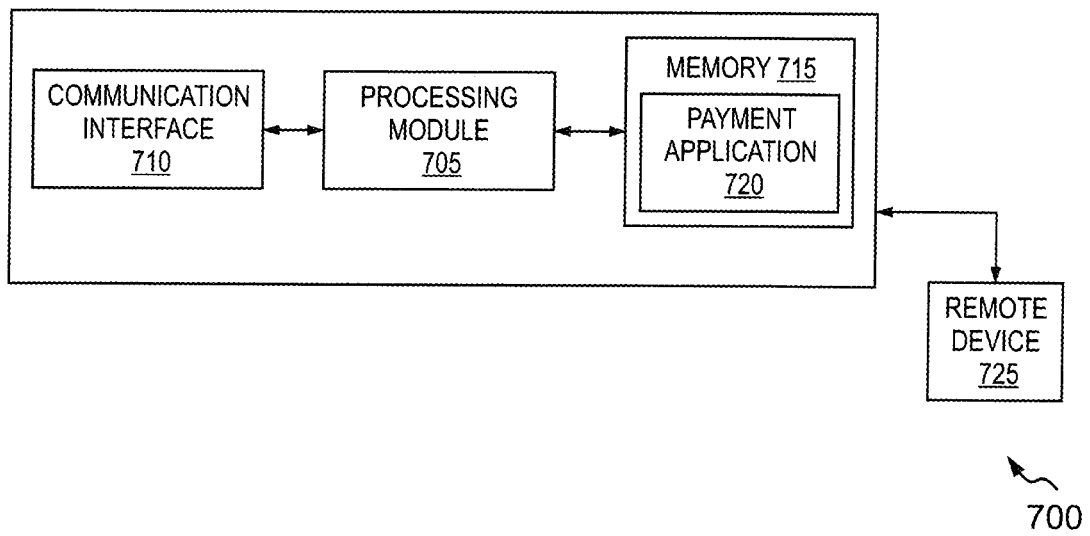
FIG. 7 is a simplified block diagram of a wallet server, in accordance with one embodiment of the present disclosure.

FIG. 7 is a simplified block diagram of a wallet server 700, in accordance with one embodiment of the present disclosure. The wallet server 700 is an example of third-party wallet application configured to provide its registered users storage of their payment cards on digital platform so as to make card-less payments. The wallet server 700 is an example of the wallet server 155 of FIG. 1. The wallet server 700 includes at least one processing module 705 communicably coupled to a communication interface 710 and at least one memory 715. In at least one embodiment, the wallet server 700 may be accessible to remote devices, such as a remote device 725, through a communication network, such as the network 150 or the payment network 145.

The processing module 705 is capable of executing the stored machine executable instructions of a payment application 720 (e.g., the payment application 442) in the memory 715 or within the processing module 705 or any storage location accessible to the processing module 705. The processing module 705 is configured to perform the various operations as explained with reference to method 500. For example, the processing module 705 is configured to receive the tokenization request from a user device of a user via the communication interface 710 and forward it to the payment server 140 for the tokenization of the payment card selected by the user. The processing module 705 is configured to store the card information of the payment card for facilitating the user to make digital payment transactions using the stored card information. The processing module 705, in conjunction with, the payment application 720 is configured to generate a floating widget that can be displayed on a checkout page of the merchant application. The floating widget includes the tokenized card information. The processing module 705 is configured to close the floating widget based on detecting an inactivity for a predetermined time-period on the merchant payment interface. Further, the processing module 705 is configured close the floating widget based on detecting switching of the merchant payment interface by an application other than the payment application running on the user device.

In an embodiment, the processing module 705 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 715 can be any type of storage accessible to the processing module 705. The memory 715 includes program instructions for facilitating the payment application 720. For example, the memory 715 may include volatile or non-volatile memories, or a combination thereof. In some non-limiting examples, the memory 715 can be four to sixty-four Megabytes (MB) of Dynamic Random Access Memory ("DRAM") or Static Random Access Memory ("SRAM"). In addition, some examples may include supplementary flash memory installed via a PCMCIA slot.

The communication interface 710 is further configured to cause display of user interfaces on the remote device 725. In one embodiment, the communication interface 710 includes a transceiver for wirelessly communicating information to, or receiving information from, the remote device 725 or other suitable display device, and/or another type of remote processing device. In another embodiment, the communication interface 710 is capable of facilitating operative communication with the remote devices and a cloud server using Application Program Interface (API) calls. The communication may be achieved over a communication network, such as the network 150.

Figure 8:
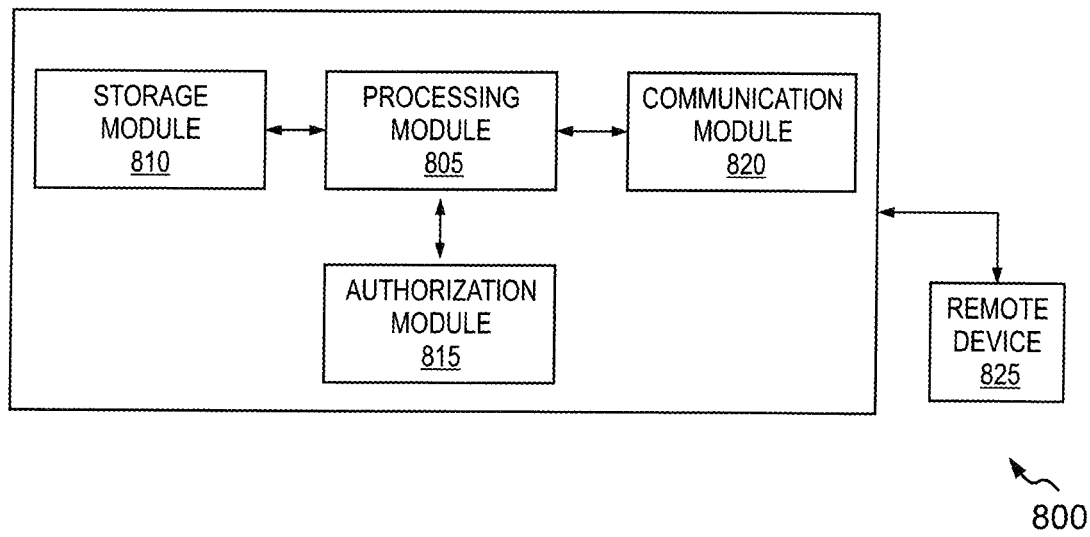
FIG. 8 is a simplified block diagram of an issuer server, in accordance with one embodiment of the present disclosure.

FIG. 8 is a simplified block diagram of an issuer server 800, in accordance with one embodiment of the present disclosure. The issuer server 800 is an example of the issuer server 135 of FIG. 1 or may be embodied in the issuer server 135. The issuer server 800 is associated with an issuer bank/issuer, in which a user may have an account. The issuer server 800 includes a processing module 805 operatively coupled to a storage module 810, an authorization module 815, and a communication module 820. The components of the issuer server 800 provided herein may not be exhaustive, and that the issuer server 800 may include more or fewer components than that of depicted in FIG. 8. Further, two or more components may be embodied in one single component, and/or one component may be configured using multiple sub-components to achieve the desired functionalities. Some components of the issuer server 800 may be configured using hardware elements, software elements, firmware elements and/or a combination thereof.

The storage module 810 is configured to store machine executable instructions to be accessed by the processing module 805. Additionally, the storage module 810 stores information related to, contact information of the user, identification information of the user, bank account number, BICs, payment card details, internet banking information, PIN, mobile personal identification number (MPIN) for mobile banking and the like. The PIN is a four-digit identification code issued by the issuer bank of the user while registering for electronic payment transactions or while issuing the payment card to the user. For example, the PIN may be issued for swipe based transactions, mobile banking, internet banking, payment string based transaction and the like. The PIN is needed to be verified for authentication of the user's identity and association with the issuer bank to process the payment transaction. This information is retrieved by the processing module 805 for cross-verification during payment transactions.

The processing module 805, in conjunction with the authorization module 815, is configured to validate the card information received from the payment server 140 via the communication module 820. Additionally, the processing module 805 is configured to verify the PIN, the sufficient funds in the issuer account and the like. Upon successful authorization of the card information and the cardholder only, the payment transaction is processed further by the processing module 805 by debiting the transaction amount from the issuer account of the user. The processing module 805 is further configured to communicate with one or more remote devices such as a remote device 825 using the communication module 820 over a network such as the network 150 or the payment network 145 of FIG. 1. The examples of the remote device 825 include, the user device 635, the payment server 140, the acquirer server 130, the wallet server 700, other computing systems of issuer and the payment network 145 and the like. The communication module 820 is capable of facilitating such operative communication with the remote devices and cloud servers using API (Application Program Interface) calls.

Figure 9:
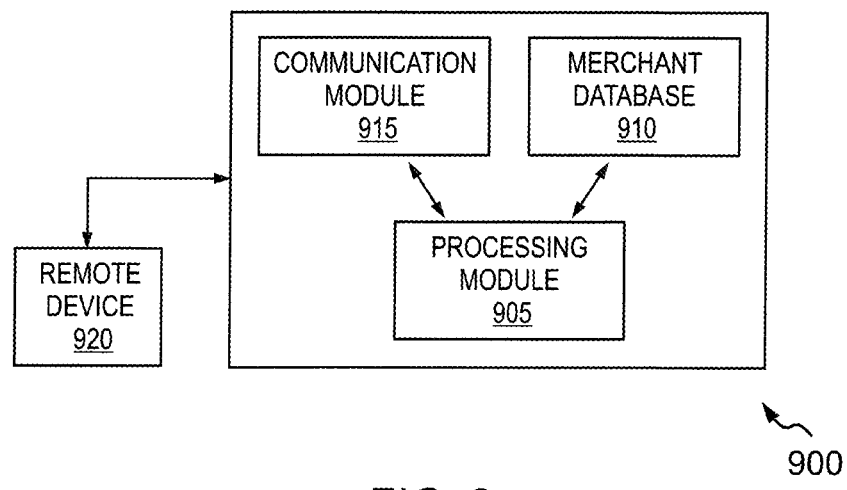
FIG. 9 is a simplified block diagram of an acquirer server, in accordance with one embodiment of the present disclosure.

FIG. 9 is a simplified block diagram of an acquirer server 900, in accordance with one embodiment of the present disclosure. The acquirer server 900 is associated with the acquirer bank of a merchant where the merchant has established an account to accept payment using the digital token. The acquirer server 900 is an example of the acquirer server 130 of FIG. 1 or may be embodied in the acquirer server 130. Further, the acquirer server 900 is configured to facilitate the digital token based payment transaction with the issuer server 800 using the payment network 145 of FIG. 1. The acquirer server 900 includes a processing module 905 communicably coupled to a merchant database 910 and a communication module 915. The components of the acquirer server 900 provided herein may not be exhaustive, and that the acquirer server 900 may include more or fewer components than that of depicted in FIG. 9. Further, two or more components may be embodied in one single component, and/or one component may be configured using multiple sub-components to achieve the desired functionalities. Some components of the acquirer server 900 may be configured using hardware elements, software elements, firmware elements and/or a combination thereof.

The merchant database 910 includes data related to a merchant, such as, but not limited to, a merchant primary account number (PAN), a merchant name, a merchant category code (MCC), a merchant city, a merchant postal code, a merchant brand name, a merchant ID and the like. The processing module 905 is configured to use the merchant ID to identify the merchant during the normal processing of payment transactions, adjustments, chargebacks, end-of-month fees and so forth. The merchant ID is different than other merchant account numbers, particularly those that identify merchants to the equipment (e.g., the POS terminals or any other merchant electronic devices) they use for processing transactions. A merchant with a single merchant processing account number may use several terminals at one location, resulting in one merchant ID and several terminal identification numbers (TIDs). The processing module 905 may be configured to store and update such merchant information in the merchant database 910 for later retrieval.

In an embodiment, the communication module 915 is capable of facilitating operative communication with a remote device 920 (e.g., the issuer server 800, the wallet server 700 and/or the payment server 140) using API calls. The communication may be achieved over a communication network, such as the network 150. For example, the processing module 905 may receive the token and the transaction amount from the merchant interface (e.g., an e-commerce website) using the communication module 915. Further, the processing module 905 is configured to receive the debited transaction amount from the payment server 140 or the issuer server 135 (or the issuer server 800) using the communication module 915. Thereafter, the processing module 905 may retrieve merchant PAN from the merchant database 910 to credit the transaction amount in the acquirer account of the merchant. Further, the processing module 905 may be configured to send the transaction status to the merchant device of the merchant and the user device 635.

Figure 10:
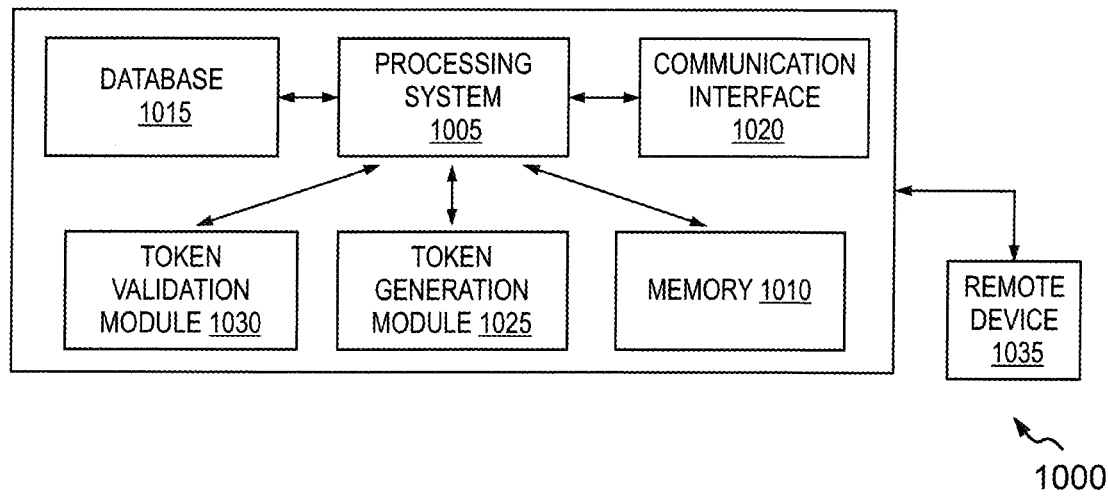
FIG. 10 is a simplified block diagram of a payment server, in accordance with one embodiment of the present disclosure.

FIG. 10 is a simplified block diagram of a payment server 1000 used for designated payment transaction, in accordance with one embodiment of the present disclosure. The payment server 1000 may correspond to the payment server 140 of FIG. 1. As explained with reference to FIG. 1, the payment server 140 is associated with a payment network 145. The payment network 145 may be used by the wallet server 700, the issuer server 800 and the acquirer server 900 as a payment interchange network. Examples of the payment interchange network include, but not limited to, Mastercard® payment system interchange network. The payment server 1000 includes a processing system 1005 configured to extract programming instructions from a memory 1010 to provide various features of the present disclosure. The components of the payment server 1000 provided herein may not be exhaustive, and that the payment server 1000 may include more or fewer components than that of depicted in FIG. 10. Further, two or more components may be embodied in one single component, and/or one component may be configured using multiple sub-components to achieve the desired functionalities. Some components of the payment server 1000 may be configured using hardware elements, software elements, firmware elements and/or a combination thereof.

Via a communication interface 1020, the processing system 1005 receives a tokenization request from a remote device 1035, such as the wallet server 700. The communication may be achieved through API calls, without loss of generality. A token generation module 1025 is operatively coupled to the processing system 1005. The token generation module 1025 includes one or more algorithms capable of generating the token. Further, a token validation module 1030 that may include a predefined rule set to be used for validation of the token received at the time of payment transaction. The token may be received from a remote entity, such as the acquirer server 900 via the communication interface 1020. The validation of the token is performed based on mapping the token with the associated PAN of the user as stored in a database 1015. The database 1015 may also store PIN, the transaction amount, acquirer account information, transaction records, merchant account information, and the like. Apart from the token generation and validation, the processing system 1005 may be configured to perform various functions such as maintenance and operation of the database 1015, token issuance and token provisioning, token domain restriction controls (e.g., the same token may be used for a Mobile NFC at Point of Sale transaction and also used in another transaction at an e-commerce website), token requestor IDs generation and the like.

Figure 11:
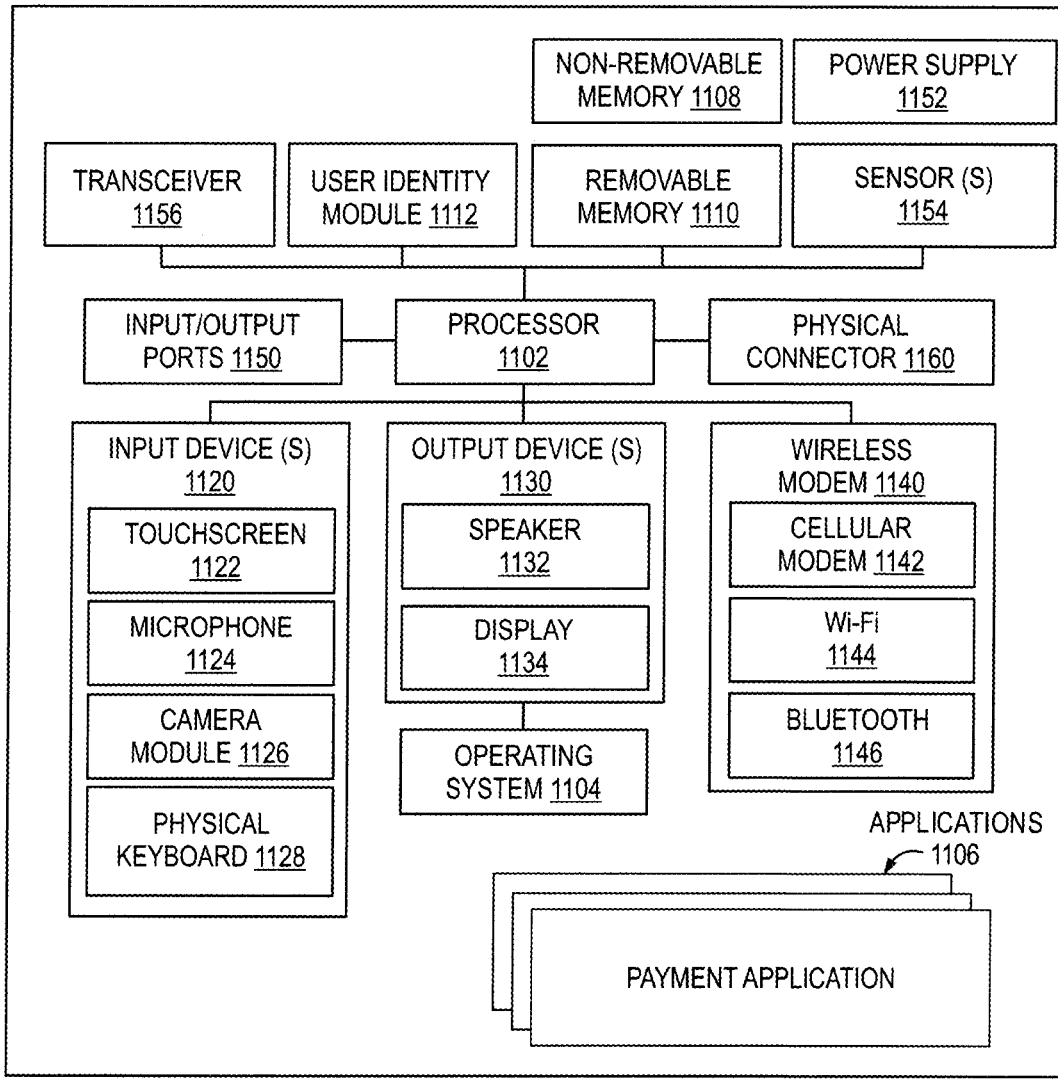
FIG. 11 shows simplified block diagram of a user device capable of implementing at least some embodiments of the present disclosure.

FIG. 11 shows simplified block diagram of a user device 1100 for example a mobile phone or a desktop computer capable of implementing the various embodiments of the present disclosure. For example, the user device 1100 may correspond to the user device 635 (e.g., the user device 115 of FIG. 1) of FIG. 6. The user device 1100 is depicted to include one or more applications, such as a payment application and a merchant application. The payment application can be an instance of an application downloaded from any of the servers 130, 135, 155 and 140. The payment application 1106 is capable of communicating with any of the servers 130, 135, 155 and 140 and the merchant payment interface 302 for facilitating a digital token in a floating widget on the merchant payment interface 302 for completing payment transactions using the tokenization of the payment card.

It should be understood that the user device 1100 as illustrated and hereinafter described is merely illustrative of one type of device and should not be taken to limit the scope of the embodiments. As such, it should be appreciated that at least some of the components described below in connection with that the user device 1100 may be optional and thus in an example embodiment may include more, less or different components than those described in connection with the example embodiment of the FIG. 11. As such, among other examples, the user device 1100 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the user device 1100 and support for one or more payment transaction applications programs (see, the applications 1106) such as the payment application, that implements one or more of the innovative features described herein. In addition, the payment application, the applications 1106 may include merchant application, common mobile computing applications (e.g., telephony applications, email applications, calendars, contact managers, web browsers, messaging applications) or any other computing application.

The illustrated user device 1100 includes one or more memory components, for example, a non-removable memory 1108 and/or removable memory 1110. The non-removable memory 1108 and/or the removable memory 1110 may be collectively known as a database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. The user device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1100 can support one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the user device 1100 and a public switched telephone network (PSTN).

The user device 1100 can further include one or more input/output ports 1150, a power supply 1152, one or more sensors 1154 for example, an accelerometer, a gyroscope, a compass, or an infrared proximity sensor for detecting the orientation or motion of the user device 1100 and biometric sensors for scanning biometric identity of an authorized user, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

The disclosed method with reference to FIG. 5, or one or more operations of the flow diagram 500 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server systems 130, 135, 155 and 140 its various components such as the computer system 605 and the database 610 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a server system associated with a payment network, a tokenization request based on selecting a payment card of a plurality of payment cards of a user from a payment application running on a user device for processing an online payment transaction using the selected payment card at a merchant payment interface on the user device, wherein the tokenization request at least comprises a card information of the selected payment card;

facilitating, by the server system, generation of a digital token comprising a tokenized card information of the selected payment card; and provisioning, by the server system, the digital token as an image in a floating widget for display at the merchant payment interface on the user device, wherein the floating widget remains visible after switching to the merchant payment interface and enables the user to manually enter the digital token at the merchant payment interface for processing the online payment transaction, wherein a screenshot of the floating widget is disabled while the token as an image is displayed to prevent copying of the token; and wherein the floating widget is automatically closed based on one or more of detecting an inactivity for a predetermined time-period on the merchant payment interface or detecting switching of the merchant payment interface by an application other than the payment application running on the user device.

2. The method as claimed in claim 1, wherein the server system is a wallet server configured to facilitate the payment application accessible on the user device to initiate the tokenization request.

3. The method as claimed in claim 2, further comprising:
performing authentication of the user based at least on verification of a biometric information of the user.

4. The method as claimed in claim 1, wherein facilitating generation of the digital token of the selected payment card, further comprising:
sending the tokenization request to a payment server, wherein the payment server is configured to facilitate an authorization of the tokenization request via an issuer server; and
receiving the digital token from the payment server, wherein the payment server is configured to generate the digital token upon successful authorization of the tokenization request.

5. The method as claimed in claim 1, further comprising:
displaying a pre-defined list of merchants for user selection on a user interface of the payment application;
receiving a user selection of one or more merchants from the pre-defined list of the merchants; and
linking at least one payment card of one or more of payment cards of the user with each of the one or more user selected merchants.

6. The method as claimed in claim 5, further comprising:
receiving a request to initiate tokenization of a pre-linked payment card from a user selected merchant of the one or more user selected merchants, the request generated based on receiving a user selection of a token based payment from the merchant payment interface; and
provisioning the digital token in the floating widget at the merchant payment interface on the user device, wherein the floating widget enables the user to enter the digital token at the merchant payment interface for processing the online payment transaction.

7. The method as claimed in claim 1, further comprising:
provisioning one of a Personal Identification Number (PIN), a password or a One-time Password (OTP) in the floating widget at the merchant payment interface on the user device, wherein the floating widget enables the user to enter the PIN, the password or the OTP at the merchant payment interface for processing the online payment transaction.

8. The method as claimed in claim 7, wherein the OTP is sent via an SMS message, and wherein provisioning the OTP is based on reading the OTP from an SMS application.

9. The method as claimed in claim 1, wherein the server system is a payment server and wherein the method further comprises:
receiving the digital token entered by the user from the floating widget at the merchant payment interface via an acquirer server;
validating the digital token;
upon successful validation of the digital token, retrieving the card information of the payment card from the digital token; and
sending the retrieved card information and a transaction amount to an issuer server for authorization.

10. The method as claimed in claim 9, wherein the server system is the issuer server and wherein the method further comprises:
notifying the payment server of successful authorization of the card information and the transaction amount;
debiting the transaction amount from an issuer account of the user;
sending a notification of debiting of the transaction amount to an acquirer server, the acquirer server configured to credit the transaction amount into a merchant account; and
facilitating completion of the payment transaction upon sending a transaction status to the user device via the wallet server.

11. A server system in a payment network, the server system comprising:
a communication interface configured to receive a tokenization request based on selecting a payment card of a plurality of payment cards of a user from a payment application running on a user device for processing an online payment transaction using the selected payment card at a merchant payment interface on the user device, wherein the tokenization request at least comprises a card information of the selected payment card;
a memory comprising executable instructions; and
a processor communicably coupled to the communication interface and configured to execute the instructions to cause the server system to at least:
facilitate generation of a digital token comprising a tokenized card information of the selected payment card; and
provision the digital token as an image in a floating widget for display at the merchant payment interface on the user device, wherein the floating widget remains visible after switching to the merchant payment interface and enables the user to manually enter the digital token at the merchant payment interface for processing the online payment transaction,
wherein a screenshot of the floating widget is disabled while the token as an image is displayed to prevent copying of the token, and
wherein the floating widget is automatically closed based on one or more of detecting an inactivity for a predetermined time-period on the merchant payment interface or detecting switching of the merchant payment interface by an application other than the payment application running on the user device.

12. The server system as claimed in claim 11, wherein the server system is a wallet server configured to facilitate the payment application accessible on the user device to initiate the tokenization request.

13. The server system as claimed in claim 11, wherein for facilitating generation of the digital token of the selected payment card, the server system is further caused to:
send the tokenization request to a payment server, wherein the payment server is configured to facilitate an authorization of the tokenization request via an issuer server; and
receive the digital token from the payment server, wherein the payment server is configured to generate the digital token upon successful authorization of the tokenization request.

14. The server system as claimed in claim 11, wherein the server system is further caused to:
display a pre-defined list of merchants for user selection on a user interface of the payment application;
receive a user selection of one or more merchants from the pre-defined list of the merchants; and
provision a respective digital token in a corresponding floating widget for each of the one or more merchants selected by the user.

15. The server system as claimed in claim 11, wherein the server system is further caused to:
provision one of a Personal Identification Number (PIN), a password or a One-time Password (OTP) in the floating widget at the merchant payment interface on the user device, wherein the floating widget enables the user to enter the PIN, the password or the OTP at the merchant payment interface for processing the online payment transaction.

16. The server system as claimed in claim 15, wherein the OTP is sent via an SMS message, and wherein to provision the OTP is based on reading the OTP from an SMS application.

17. The server system as claimed in claim 11, wherein the server system is a payment server and wherein the server system is caused to:
receive the digital token entered by the user from the floating widget at the merchant payment interface via an acquirer server;
validate the digital token;
upon successful validation of the digital token, retrieve the card information of the payment card from the digital token;
send the retrieved card information and a transaction amount to an issuer server for authorization.

18. The server system as claimed in claim 17, wherein the server system is the issuer server and wherein the server system is caused to:
notify the payment server of successful authorization of the card information and the transaction amount;
debit the transaction amount from an issuer account of the user;
send a notification of debiting of the transaction amount to an acquirer server, the acquirer server configured to credit the transaction amount into a merchant account; and
facilitate completion of the payment transaction upon sending a transaction status to the user device via the wallet server.

19. A computer program product comprising at least one non-transitory computer-readable storage medium, the computer-readable storage medium comprising a set of instructions, which, when executed by one or more processors in an electronic device, cause the electronic device to at least:
receive a tokenization request based on selecting a payment card of a plurality of payment cards of a user for processing an online payment transaction using the selected payment card at a merchant payment interface, wherein the tokenization request at least comprises a card information of the selected payment card;
facilitate generation of a digital token comprising a tokenized card information of the selected payment card; and
provision the digital token as an image in a floating widget for display at the merchant payment interface, wherein the floating widget remains visible after switching to the merchant payment interface and enables the user to manually enter the digital token at the merchant payment interface for processing the online payment transaction,
wherein a screenshot of the floating widget is disabled while the token as an image is displayed to prevent copying of the token; and
wherein the floating widget is automatically closed based on one or more of detecting an inactivity for a predetermined time-period on the merchant payment interface or detecting switching of the merchant payment interface by an application other than the payment application running on the user device.

20. The computer program product of claim 19, wherein the instructions, when executed, further cause the electronic device to provision one of a Personal Identification Number (PIN), a password or a One-time Password (OTP) in the floating widget at the merchant payment interface on the user device, wherein the floating widget enables the user to enter the PIN, the password or the OTP at the merchant payment interface for processing the online payment transaction; and
wherein the OTP is sent via an SMS message, and wherein to provision the OTP is based on reading the OTP from an SMS application.

\* \* \* \* \*